Oct. 8, 1963 R. HARPER ET AL 3,106,070
COLD GAS SUPPLY SYSTEM
Filed Oct. 9, 1961
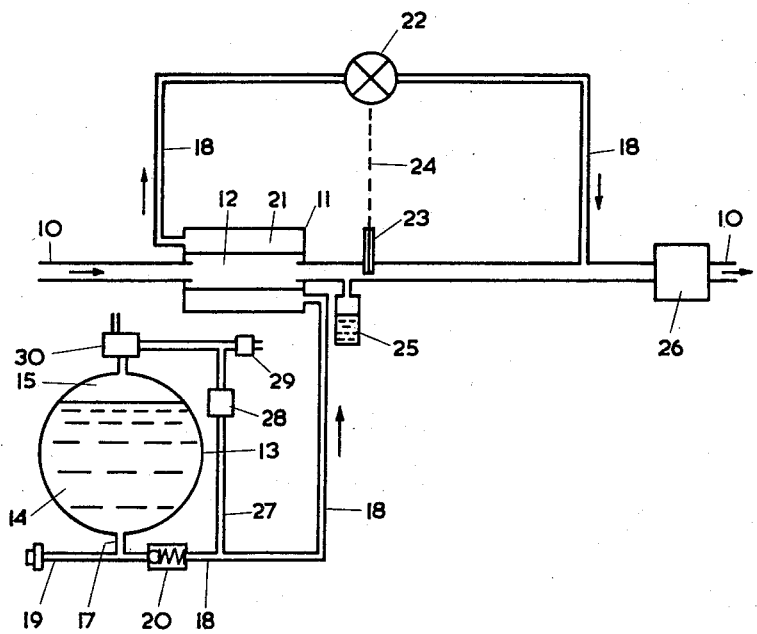
INVENTORS
REGINALD J.V. SNELL
RAYMOND HARPER
BY
ATTORNEY

3,106,070
COLD GAS SUPPLY SYSTEM

Raymond Harper, Harlow, and Reginald J. V. Snell, Fulwood, Preston, England; said Harper assignor to The British Oxygen Company Limited and English Electric Aviation Limited, jointly
Filed Oct. 9, 1961, Ser. No. 156,183
Claims priority, application Great Britain Oct. 7, 1960
3 Claims. (Cl. 62—48)

This invention relates to a system for supplying cold gas to aviators' suits for ventilation purposes, for example in tropical climates during periods preceding take-off of aircraft when cabin cooling systems dependent upon the engines operate unsatisfactorily because of low engine speeds.

The system of the present invention employs the principle of utilizing a stored supply of low-temperature liquefied gas such as an atmospheric gas as a source of cold, and consuming this liquefied gas in establishing a supply of cold ventilating gas to aviators' suits when circumstances such as those mentioned above render suit ventilation desirable.

According to the present invention, in a system for supplying cold gas to aviators' suits, a supply of warm suit-ventilating gas under pressure (such as air from an engine compressor) is passed through one side of a heat exchanger, through the other side of which passes cooling gas drawn off in the liquid state from a stored supply of low-temperature liquefied gas, whereby the suit-ventilating gas is cooled and the liquefied gas is wholly vaporised in said heat exchanger, the vaporised cooling gas being fed into admixture with the suit-ventilating gas, and the rate of flow of cooling gas being metered by a flow-control valve which is located downstream of the heat exchanger and which is actuated by a thermostat device also located downstream of the heat exchanger to be responsive to the temperature of the cooled suit-ventilating gas.

The thermostat device may be located downstream of the heat exchanger but upstream of the junction of the cooling gas with the suit-ventilating gas, or alternatively the thermostat device may be located downstream of the junction of the cooling gas with the suit-ventilating gas.

A collecting device may be provided for entrapping liquid condensed from the suit-ventilating gas by the cooling thereof effected by the heat exchanger.

An embodiment of the invention will now be described with reference to the accompanying drawing, which is a schematic diagram depicting a system according to the present invention.

Referring to the drawing, a system for supplying cold gas to aviators' suits comprises a supply conduit 10 for suit-ventilating gas, the direction of flow of which is indicated by arrows. The conduit 10 receives suit-ventilating gas such as compressed air from a supply source (not shown) such as an engine compressor, or a cylinder of compressed air, or any other suitable source of supply which may either be already available or easily installed in an aircraft. The most usual source of supply is an engine compressor, from which hot compressed air can be readily bled off for use as suit-ventilating gas, and for the purpose of this description it will be assumed that the supply conduit 10 is receiving engine compressor air after it has been subjected to a degree of pre-cooling to reduce its temperature to the order of 70° C. A heat exchanger is represented diagrammatically at 11, through one side 12 of which the suit-ventilating air flowing along the conduit 10 passes to be cooled down to a suitable temperature for supply to an aviator's suit (not shown).

A container for liquefied gas such as liquid nitrogen is indicated at 13, and is shown as containing a body of liquid gas 14 (hereafter termed the "liquid phase" of the container 13) above which is a gas space 15 (hereafter termed the "gaseous phase" of the container 13). The container 13 is suitably heat-insulated, as for example by being constructed as a double-wall vessel with the space between the walls evacuated.

The container 13 is self-pressurised in conventional manner to promote flow of liquid nitrogen from the container 13 via a bottom outlet 17 to a cooling gas conduit 18. A filling extension 19 is provided, through which the container 13 can be recharged with liquid nitrogen. Vapour pressure is generated in the gaseous phase 15 of the container in conventional manner, due to liquid nitrogen passing a lightly-loaded check valve 20 and reaching a pressure build-up circuit represented by a conduit 27 extending between the conduit 18 and the gaseous phase 15 of the container 13, so that gas vaporised in the conduit 27 produces vapour pressure in the gaseous phase 15 and promotes the flow of liquid nitrogen from the container 13 through the outlet 17. The conduit 27 of the build-up circuit contains a conventional pressure-closing valve 28 which closes at a predetermined gas vapour pressure to stop further pressure build-up, a conventional excess pressure relief valve 29, and a conventional vent and build-up valve 30 which is employed to vent the container 13 during re-charging with liquid nitrogen.

The cooling gas conduit 18 passes liquid gas from the container 13 through the other side 21 of the heat exchanger 11, and in heat exchange relationship with the suit-ventilating gas flowing through the first side 12 of the heat exchanger, whereby the cooling gas is warmed and wholly vaporised in the heat exchanger 11, while the suit-ventilating gas is correspondingly cooled to a temperature suitable for suit-ventilation purposes, for example a temperature of the order of 5° C.

The rate of flow of cooling gas in the conduit 18, to produce this desirable final temperature of approximately 5° C. both of the suit-ventilating gas and of the cooling gas itself, is metered by a valve 22 which is actuated by a thermostat device indicated at 23. This device is located immediately downstream of the heat exchanger 11, so as to be responsive to the temperature of the cooled suit-ventilating gas as the latter emerges from the heat exchanger, and the chain line 24 connecting the thermostat device 23 with the metering valve 22 indicates an operative connection therebetween whereby the valve is actuated in response to the temperature sensed by the device in manner to meter the flow of cooling gas for maintaining the temperature of the suit-ventilating gas leaving the heat exchanger substantially constantly of the order of 5° C.

Hot air from an engine compressor contains water vapour, which is condensed by cooling, but the cooling being only down to a temperature of 5° C. avoids the possibility of icing of the heat exchanger 11.

Downstream of the heat exchanger 11 is indicated a collecting device 25 for entrapping liquid condensed from the suit-ventilating gas. With this arrangement it will be apparent that besides being cooled the suit-ventilating gas has also under gone some degree of drying, the condensed liquid being entrapped in the collecting device 25 for ultimate disposal as by draining off.

The conduit 18 joins the conduit 10 at a junction downstream of the heat exchanger, so that the cooling gas is fed into admixture with the suit-ventilating gas after the latter has passed the heat exchanger. Since both are at substantially the same temperature there is little or no temperature change due to their admixture, but since the cooling gas is dry by reason of its evaporation from a liquid condition, it follows that a further drying effect is obtained by mixing the cooling gas with the suit-ventilating gas.

A pressure reducing valve in the conduit 10 is indicated at 26, the object of which is to ensure that suit-ventilating air flows to aviators' suits at a steady pressure which is suitably low for the purpose of ventilation, for example at a pressure of approximately 5 p.s.i.g.

The liquid collecting device 25 could be dispensed with, if the need for drying the suit-ventilating gas is deemed unnecessary, and if the device 25 is not employed the thermostat device which actuates the metering valve 22 could be located in the conduit 10 downstream of the junction of the cooling gas with the suit-ventilating gas.

No attempt has been made to indicate in the drawing such obviously necessary items as a master on/off control valve by means of which the system as a whole can be rendered operative or inoperative, and individual control valves by means of which the supply of suit-ventilating gas can be controlled for example by each of several users of several suits supplied by a single system, but it will be appreciated that the form and disposition of such items can vary considerably, and tends to be a matter of choice and convenience of non-inventive nature.

In the foregoing description reference is made to the use of liquid nitrogen as the cooling gas, nitrogen being preferred because it is an inert gas, but it may be more convenient to utilize a different liquefied gas as the cooling gas, such for example as liquid oxygen. Thus the use of liquid oxygen for cooling suit-ventilating gas may prove to be very convenient in connection with aircraft which already carry a supply of liquid oxygen for breathing purposes.

We claim:

1. Ventilating apparatus for an aviator's suit, comprising in combination a heat exchanger, said exchanger including first and second fluid sides respectively for compressed fluid to be cooled and coolant fluids, first conduit means for passing said compressed fluid to be cooled from a pressure source to and from the first fluid side of said heat exchanger, a compressed coolant storage container, a supply of compressed liquefied low-temperature coolant fluid in said storage container, second conduit means connecting said supply of coolant to the second side of said heat exchanger, coolant fluid flow control means in said second conduit upstream of said heat exchanger, said second conduit means connecting with said first conduit means after directing said coolant through said heat exchanger, a thermostat device in said first conduit means downstream of said heat exchanger responsive to variations in temperature of the cooled fluid flowing from said heat exchanger, a coolant flow-control valve movable between controlling positions in said second conduit means downstream of said heat exchanger, and means operatively connecting said thermostat and said flow-control valve to control the flow of coolant into admixture with said cooled fluid.

2. The combination claimed in claim 1, and including a liquid trap in said first conduit means, downstream of said heat exchanger.

3. The combination claimed in claim 1 wherein said fluid flow control means in said second conduit upstream of said heat exchanger is a check valve.

References Cited in the file of this patent

UNITED STATES PATENTS

| | | |
|---|---|---|
| 655,148 | Dickerson | July 31, 1900 |
| 2,819,590 | Green | Jan. 14, 1958 |
| 2,893,638 | Rimsha | July 7, 1959 |
| 2,983,116 | Makowski | May 9, 1961 |
| 2,984,994 | Hankins | May 23, 1961 |
| 2,990,695 | Leffingwell | July 4, 1961 |